UNITED STATES PATENT OFFICE.

WALTHER NERNST, OF GÖTTINGEN, GERMANY, ASSIGNOR TO GEORGE WESTINGHOUSE, OF PITTSBURG, PENNSYLVANIA.

MATERIAL FOR ELECTRIC-LAMP GLOWERS.

SPECIFICATION forming part of Letters Patent No. 685,730, dated October 29, 1901.

Application filed August 24, 1899. Renewed June 18, 1900. Serial No. 20,778. (No specimens.)

*To all whom it may concern:*

Be it known that I, WALTHER NERNST, a subject of the Emperor of Germany, residing in Göttingen, Germany, have invented certain new and useful Improvements in Materials for Electric-Lamp Glowers, of which the following is a specification.

I have made a long series of experiments with a view to finding the best composition for electric-lamp glowers, such as are adapted for use in so-called "Nernst" lamps. In the course of these experiments I have discovered that certain intimate mixtures of the rare earths possess the qualities needed in lamps of this class in a higher degree than other mixtures. As a constant ingredient of a large number of such mixtures I have successfully made use of the oxid of zirconium, and I have found in many mixtures containing about eighty-five parts of the oxid of zirconium qualities which especially adapt them to serve as glowers under the conditions of practical use. While I have found that the oxid of zirconium unites to form a good mixture with some of the earths in somewhat different proportions, yet I find that with the oxids of erbium, yttrium, neodidymium, scandium, and thorium the best proportions are eighty-five parts of the oxid of zirconium and fifteen parts of the other earth in each instance. Thus an excellent mixture which I have used in practical glowers with great success is one composed of eighty-five parts of the oxid of zirconium and fifteen parts of the oxid of yttrium. Other good mixtures are oxid of zirconium, eighty-five parts, and oxid of erbium, fifteen parts; oxid of zirconium, eighty-five parts, and oxid of neodidymium, fifteen parts; oxid of zirconium, eighty-five parts, and oxid of scandium, fifteen parts; oxid of zirconium, eighty-five parts, and oxid of thorium, fifteen parts.

My present invention relates to the employment in electric-lamp glowers of mixtures containing approximately eighty-five parts of the oxid of zirconium and fifteen parts of one of the other rare earths.

The manner in which I make a glower having the constituent elements above set forth is to take about eighty-five parts of the oxid of zirconium with fifteen parts of either the oxid of erbium, the oxid of neodidymium, the oxid of scandium, or the oxid of thorium, all in powdered state, and form from them a paste by adding water and some binding material, such as tragacanth, dextrine, or the like. The powdered oxids are first fully mixed together, and the binding material is also finely powdered and thoroughly mixed with the oxids. Sufficient water is added to form a paste, and the glowers are then shaped by any preferred process. In case the glowers are to be tubular in form the pasty material is passed through a press and shaped by that means.

I claim as my invention—

1. A glower for electric lamps composed of approximately eighty-five per cent. of zirconia and fifteen per cent. of one of the other rare earths.

2. A glower for electric lamps composed of approximately eighty-five per cent. zirconia and fifteen per cent. of yttria.

3. A material for making glowers for electric lamps of the type described, composed of a mixture of rare earths, such mixture containing approximately eighty-five per cent. of zirconia.

Signed by me at Berlin this 10th day of August, 1899.

WALTHER NERNST.

Witnesses:
 HENRY NOEL POTTER,
 WOLDEMAR HAUPT.